No. 746,583. PATENTED DEC. 8, 1903.
F. SAXON.
GEAR WHEEL.
APPLICATION FILED APR. 9, 1903.
NO MODEL.
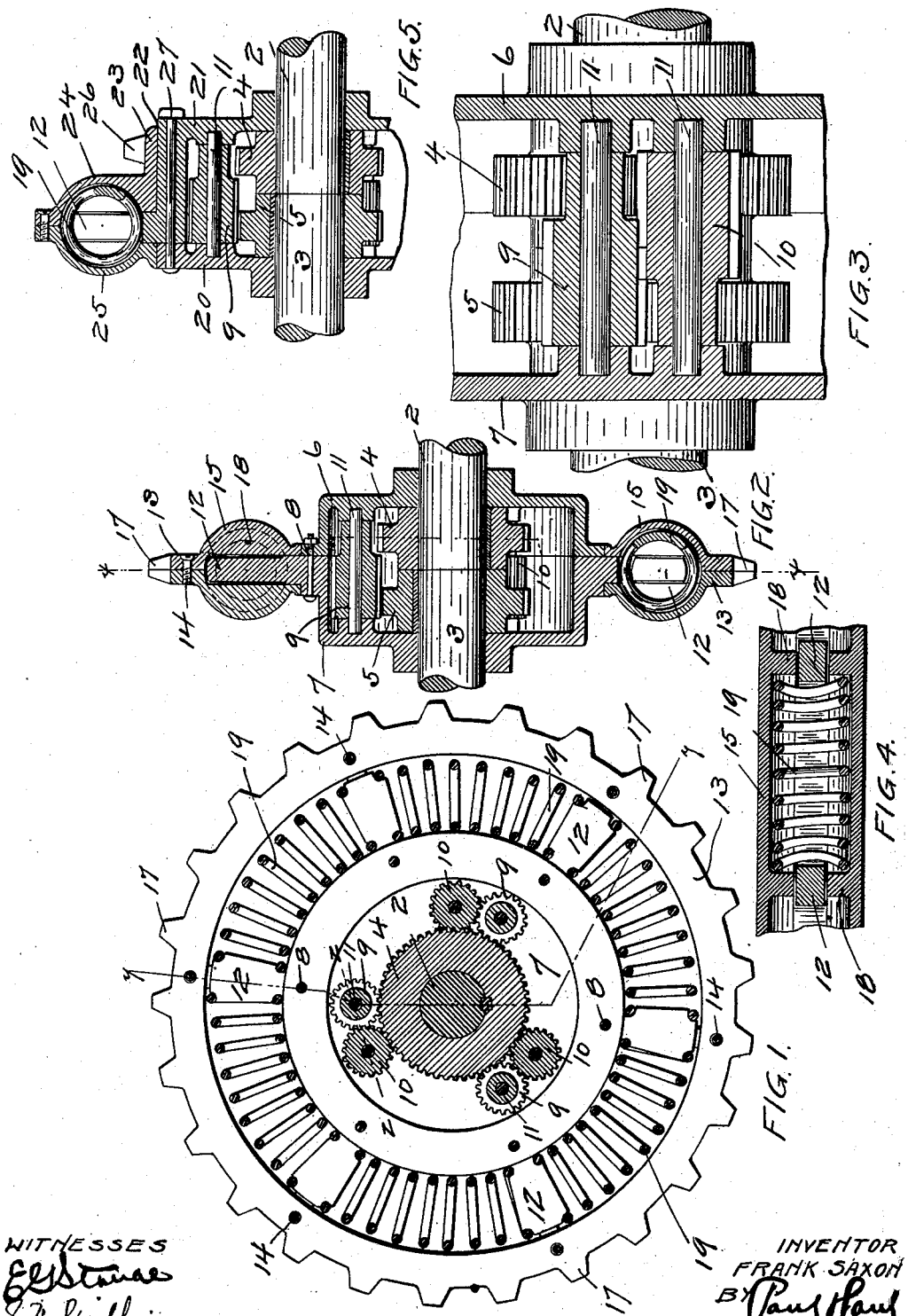
WITNESSES
INVENTOR
FRANK SAXON
BY Paul Paul
HIS ATTORNEYS No. 746,583. Patented December 8, 1903.

UNITED STATES PATENT OFFICE.

FRANK SAXON, OF WORTHINGTON, MINNESOTA.

GEAR-WHEEL.

SPECIFICATION forming part of Letters Patent No. 746,583, dated December 8, 1903.

Application filed April 9, 1903. Serial No. 151,735. (No model.)

*To all whom it may concern:*

Be it known that I, FRANK SAXON, of Worthington, in the county of Nobles, State of Minnesota, have invented certain new and useful Improvements in Gear-Wheels, of which the following is a specification.

My invention relates to compensating or equalizing gears embodying the principles shown and described in Letters Patent of the United States granted to me November 29, 1892, Serial No. 487,129, and June 17, 1902, No. 702,747.

The object of my invention is to provide a compensating gear adapted for use particularly on automobiles, though capable of use wherever a gear of this type is necessary or desirable.

The invention consists generally in various constructions and combinations, all as hereinafter described, and particularly pointed out in the claims.

In the accompanying drawings, forming part of this specification, Figure 1 is a section on the line $x\ x$ of Fig. 2. Fig. 2 is a section on the line $y\ y$ of Fig. 1. Fig. 3 is a section on the line $z\ z$ of Fig. 1. Fig. 4 is a detail showing the manner of arranging the springs between the parts of the gear, and Fig. 5 shows a slightly-modified construction.

In the drawings, 2 and 3 represent shafts with abutting ends, whereon the gear is mounted.

4 is a gear-wheel keyed on the shaft 2, and 5 a similar gear secured on the shaft 3. These gears are of substantially the same size, as shown.

6 represents one wall or side of a gear-casing fitting on the shaft 2 over the gear 4, and 7 is a similar wall arranged on the shaft 3 and inclosing the gear 5. These walls when placed together form a closed box or casing around the abutting ends of the shaft for the gears thereon. The walls 6 and 7 are secured together at suitable intervals by bolts and turn together freely on their supporting-shafts independently of the gears 4 and 5.

9 and 10 represent pinions mounted on pins 11, that have bearings in the walls 6 and 7, and said pinions are arranged in pairs, as shown in Fig. 1, one gear of each pair meshing with the gear 5. The bearing-surfaces of the pinions 9 and 10 preferably extend the full distance between the walls 6 and 7, each pinion of a pair being cut away opposite the gear 4, while the pinion 11 of that same pair is reversely arranged. The wall 7 is provided with a series of (preferably six) lugs 12, projecting radially therefrom. Rings 13 are provided outside said lugs and secured together by screws 14 or other suitable means and have casings 15, substantially semicircular in cross-section, inclosing said lugs on the sides and having bearings on the walls 6 and 7. A series of sprocket-teeth 17 are provided on the rings 13, and at intervals on the inner surfaces of the casings 15 I provide webs 18 at right angles, substantially, to the lugs 12 and arranged to slide over the surfaces thereof as the parts of the mechanism are moved backward or forward. These webs are arranged in pairs, as shown, there being one pair for each lug, and arranged opposite the same and between each pair of webs I provide cushion-springs 19, seated at their ends in the surfaces of the webs and arranged to be compressed by the movement of the webs or of the lugs in either direction. The rings 13 and their casings will, as indicated by Fig. 2, be movable in either direction independently of the casings 6 and 7 and the lugs 12, according to the direction in which the mechanism connected with the sprocket-teeth is operated. Movement of the rings 13 in one direction will compress the springs 19 between one pair of webs and the lug of the adjoining pair and yieldingly communicate the force exerted through the said lug and the pinion 9 to the gear 5 and through the pinion 10, meshing with the pinion 9, and the gear 4 to equalize the speed of the shafts 2 and 3 in making a turn. When the rings 13 are driven in the other direction, the springs will again be compressed and the operation described repeated. Movement of the lugs 12 in either direction will also cause compression of the springs and yieldingly communicate the force exerted to the sprocket.

In Fig. 5 I have shown a modification which consists in providing walls 20 and 21, forming a casing for the shaft-gears, the wall 21 having a bearing-surface 22 to receive a flange 23, provided on the inner edge of the spring-casing 24, the other section 25 of said spring-casing being secured to the section 24 by screws or other suitable means and having bearings on the wall 20. A series of sprocket-teeth 26 are provided on the flange 23, and bolts 27 connect the walls 20 and 21. This construction is similar to that described, except that the sprocket instead of being outside the lugs 12 is arranged near the base of the same on the surface of the gear-casing.

I claim as my invention—

1. A compensating gear-wheel, comprising two independently-movable gears, pinions arranged in pairs around said gears, the pinions of each pair meshing one with another, and one pinion meshing with one gear and one with the other, a casing inclosing said pinions and having a series of lugs radiating outwardly at intervals therefrom, a ring inclosing said lugs and provided with webs arranged in pairs at intervals thereon, said webs and lugs being relatively movable with their supports, springs provided between said webs and lugs, and a sprocket provided on said ring.

2. A compensating gear, comprising shafts and gears secured thereon and independently movable therewith, a casing inclosing said gears and having a series of outwardly-projecting lugs, pinions arranged in pairs in bearings in said casing, each pinion of a pair meshing with the other pinion of the same pair, and one pinion of a pair meshing with one gear and the other pinion with the other gear, a hollow ring consisting of two sections inclosing said lugs and secured together and provided with curved walls having interiorly-arranged webs opposite said lugs, and springs provided between the pairs of webs and lugs.

3. A compensating gear, comprising a suitable casing having outwardly-projecting lugs at intervals on its periphery, gears therein movable independently of said casing, pinions mounted in said casing in mesh respectively with said gears, a ring provided with a series of webs arranged in pairs at intervals on each side of said lugs, a sprocket provided on said ring, and springs interposed between the adjacent pairs of webs and lugs, substantially as described.

4. The combination, with the shafts 2 and 3, of gears 4 and 5 secured thereon and independently movable with respect to each other, a casing loosely mounted on said shafts and inclosing said gears and having radiating lugs, pinions mounted in pairs in said casing, each pinion of a pair meshing with the other pinion of the same pair, and one pinion of a pair meshing with one gear and one with the other, a ring having bearings on said casing and provided with a series of sprocket-teeth and having curved walls and webs on the inner surfaces of said walls opposite said lugs, said lugs and webs being relatively movable, and coil-springs inclosed by said curved walls between the adjacent pairs of webs and lugs, substantially as described.

5. A compensating gear, comprising a suitable frame or casing having lugs radiating from its periphery, independently-movable gears mounted in said casing, pinions having bearings in said casing and in mesh respectively with said gears, an independently-movable gear having webs arranged in pairs upon each side of said lugs, and coil-springs having their ends bearing upon said lugs and webs.

In witness whereof I have hereunto set my hand this 1st day of April, 1903.

FRANK SAXON.

In presence of—
PETER THOMPSON,
S. KINDLUND.